Oct. 8, 1957 R. S. STRIMEL 2,808,721
REGISTERING SYSTEM FOR USE IN CONJUNCTION
WITH TESTING MACHINES
Filed June 11, 1951 5 Sheets—Sheet 1

INVENTOR
Robert S. Strimel
BY
Synnestvedt & Lechner
ATTORNEYS

INVENTOR
Robert S. Strimel
BY
Synnestvedt & Lechner
ATTORNEYS

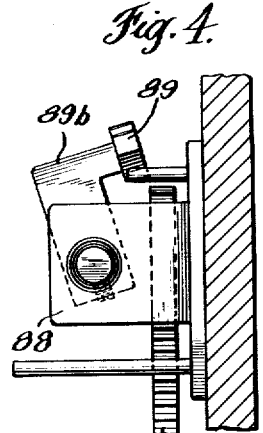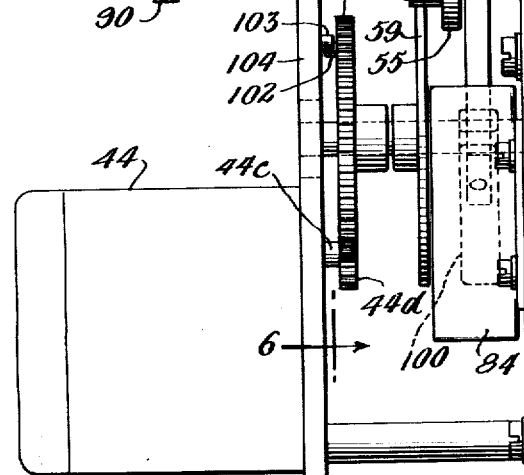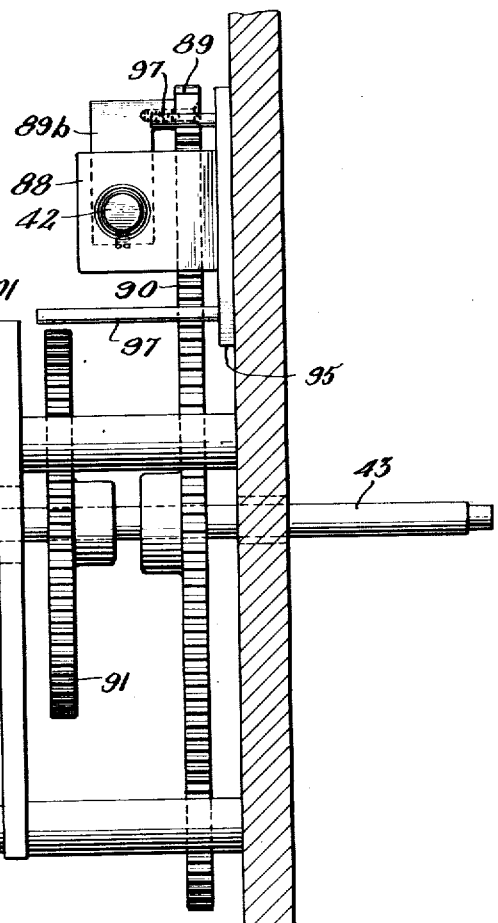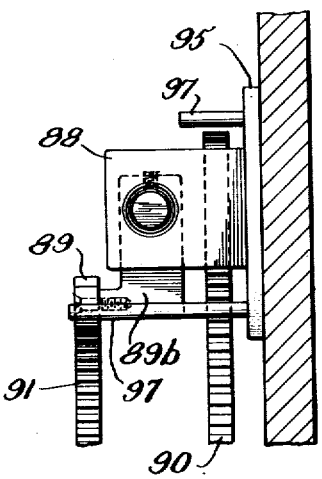

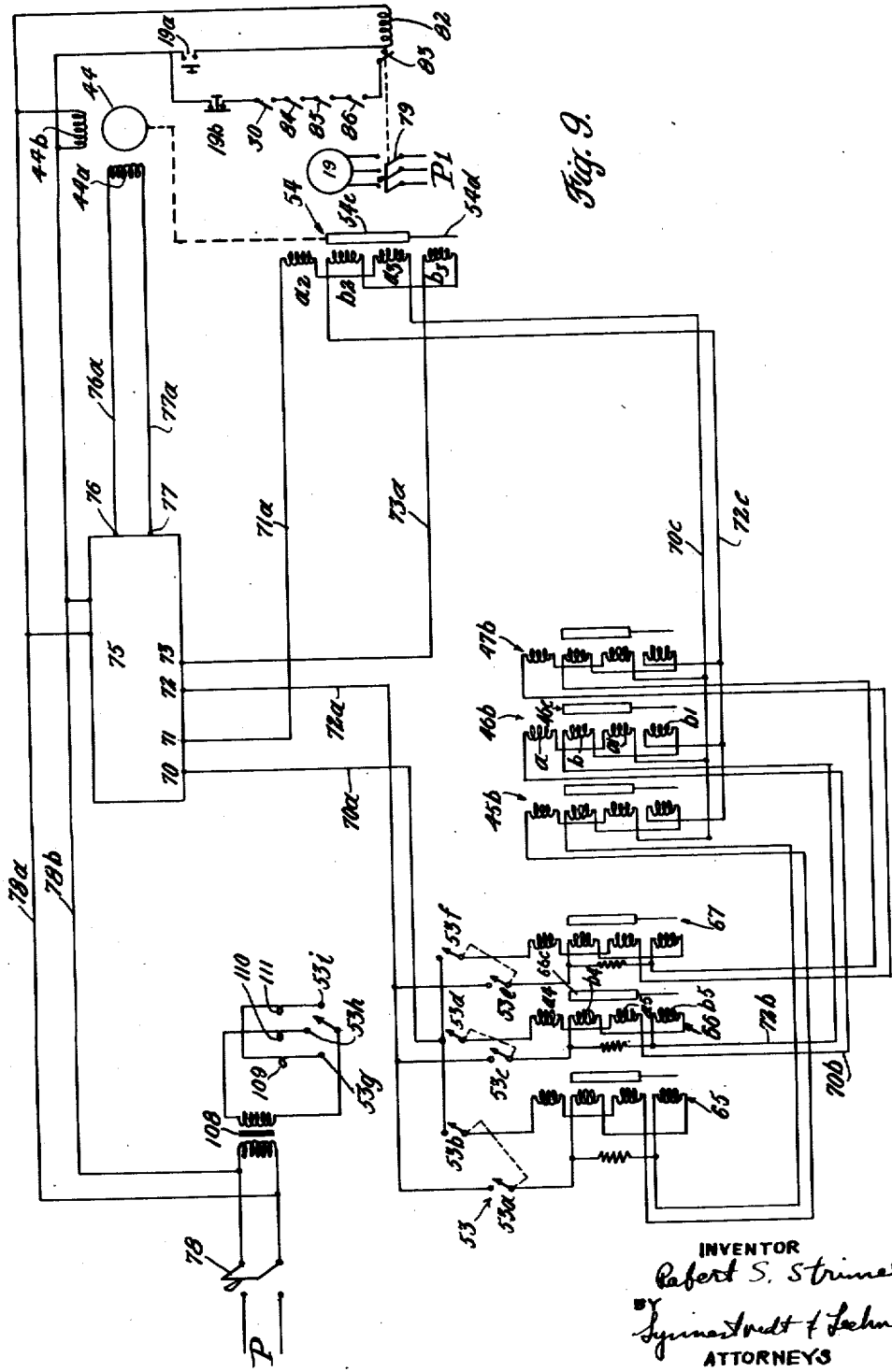

United States Patent Office 2,808,721
Patented Oct. 8, 1957

2,808,721

REGISTERING SYSTEM FOR USE IN CONJUNCTION WITH TESTING MACHINES

Robert S. Strimel, Bridgeport, Pa., assignor to Tenius Olsen Testing Machine Company, Willow Grove, Pa., a corporation of Pennsylvania Application June 11, 1951, Serial No. 230,877

8 Claims. (Cl. 73—88.5)

The present invention relates to the measurement of stress applied to an article, for instance stress in such article in compression, flexure or tension.

One of the principal objects of the invention is to provide for the measurement and registering of stress over a wide range of testing pressures on a single registering device. By registering is here meant either indicating or recording or both.

The invention is of especial advantage and utility in laboratories where accurate testing is desired, and in manufacturing establishments where the amount of testing is extensive and where fast, accurate and convenient testing procedures are of paramount concern. In this respect the machines are especially useful because of the versatility and the wide scope of application.

In a machine constructed in accordance with the present invention there is a wide difference between the maximum and minimum ranges that may be registered and this is a particularly significant aspect in test work of the kind in question. Not only are the machines adaptable to the countless thousands of routine tests of steel or wooden articles but are equally useful for the compression testing of large and small concrete specimens, and further are extremely useful for soil testing and related work.

Furthermore, the operation of the machine is the very essence of simplicity and therefore does not require special experience or training or a high degree of skill on the part of the operator.

In a machine of the general kind to which the present invention relates, the article to be tested is supported in a cross-head or similar mechanism, one portion of which is stationary and the other portion is adapted to be moved relative thereto. Ordinarily in such a machine, the article may be held in either of two positions, one of which provides for testing in compression or flexure and the other for testing in tension. Load application is accomplished by a hydraulic piston and cylinder. The hydraulic system incorporates, inter alia, a pump and a control valve which provide for uniform rates of load application. The hydraulic or fluid pressure developed in the cylinder is transmitted to the registering system.

In accordance with the embodiment of the invention shown herein, the registering system includes a plurality of pressure actuated devices adapted to receive fluid pressure from the cylinder and to develop an electrical signal in accordance with the pressure received, and further includes a servo system adapted to receive a signal from any of the pressure-actuated devices and to drive a load registering device in accordance with the said signal.

In the registering system of the invention each pressure-actuated device is preferably adapted to be selectively and independently connected with the fluid pressure mechanism. Each pressure device operates within a predetermined maximum of fluid pressure; there being a device for maximum and minimum pressure levels and preferably also at least one device for intermediate pressures. Thus by means of this arrangement a very wide range or spread of test pressures may be measured, for example the minimum test pressure may be 1/100 of the maximum test pressure. Further, the arrangement provides for each pressure-actuated device to be selectively and independently interconnected with the servo system which drives the load registering device.

A simple selector means is provided for the operator to select the desired pressure range, and upon application of fluid pressure, the system automatically measures and directly registers this pressure on a single load registering device.

The registering system contemplates a load registering device which may take the form of a dial arrangement comprising a movable pointer and associated calibrated scales or may take the form of a stress-strain recorder mechanism. In the present invention both of these forms are combined in a novel manner, while at the same time retaining the capability of using either the pointer or the recorder as the principal registering device. Provision for use of the pointer with or without the recorder is advantageous because in routine test work a convenient means is provided for the operator to visually note the pressure being applied; and in more extensive testing a stress-strain diagram or the like may be desired, and this is provided for by the recorder.

The arrangement includes a calibrated scale for each pressure range. These calibrations are so arranged that a single set of calibrations serves for each scale, and this greatly simplifies the mechanism as compared with arrangements requiring the use of completely separate scales and pointers.

Another unique feature of the present invention is the provision of a signal device actuated upon selection by the operator of any of the pressure ranges. The signal device visually indicates to the operator the particular range scale to be read and thus provides against inadvertent reading of an incorrect scale.

Another important feature of the present invention is an adjustable mechanical interconnection between the servo driving system and the recorder. This mechanism provides a simple, convenient and easy means for obtaining magnification or spreading out of the reading, which makes possible the accurate study of the specimen behavior in any selected portion of the load range.

Another important feature of the invention is the provision for certain safety mechanisms which prevent damage to the equipment; for example, the pressure actuated devices are provided with mechanism which will automatically shut off the operation of the hydraulic system if an excessively high pressure should be communicated to a low pressure device.

Another safety feature is incorporated in the drive mechanism between the servo system and the registering devices which automatically stops the operation of the registering devices when they reach their limits of motion.

How the foregoing features and advantages are attained will be readily apparent from the following description and the drawings wherein:

Figure 3 is a further enlarged view of certain operating parts taken as indicated by the section line 3—3 applied to Figure 2;

Figures 4 and 5 are views of certain details appearing also in Figure 3 but showing parts in different position;

Figure 9 is a schematic wiring diagram of certain of the control devices included in the machine.

Figure 1:
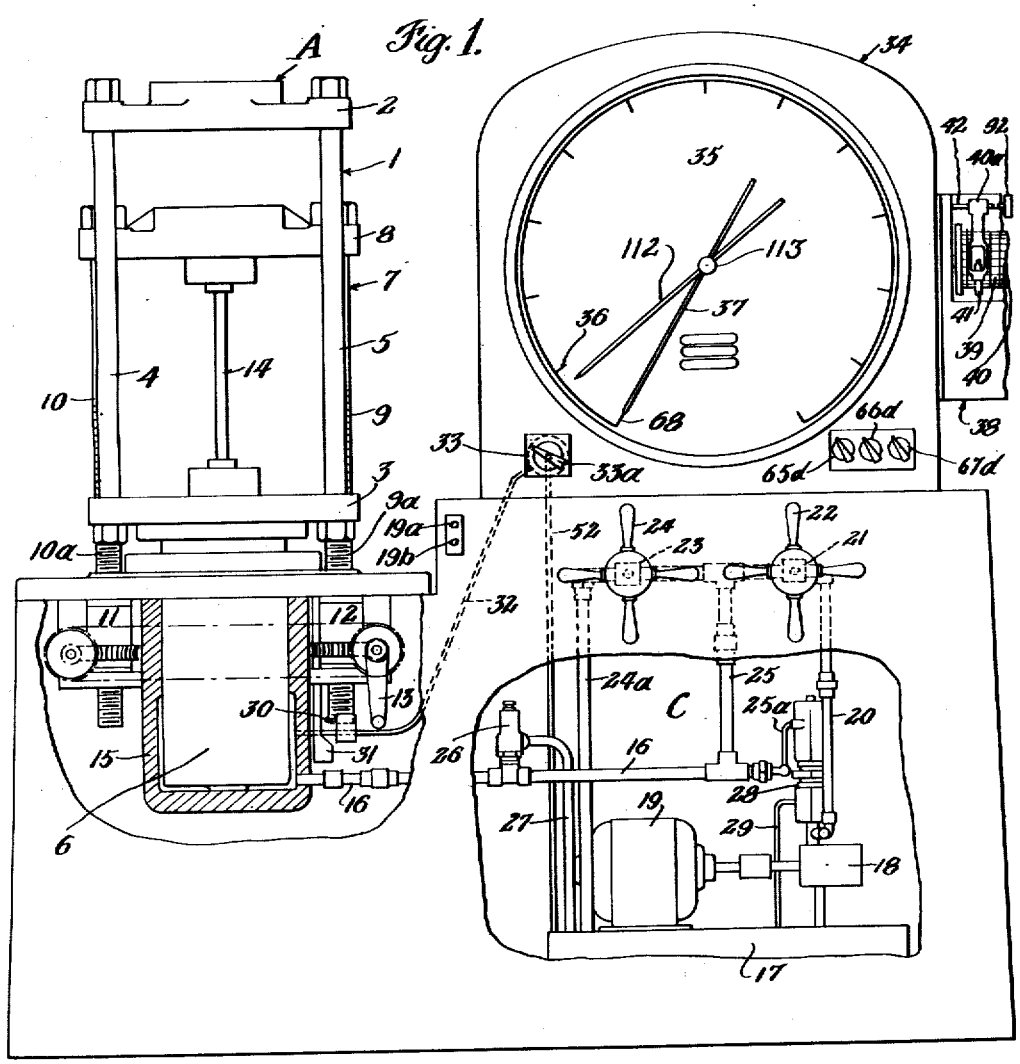
Figure 1 is a front elevational view of a testing machine constructed according to the present invention.

Referring first to Figure 1 there is seen a loading unit A having cradles 1 and 7. Cradle 1 is comprised of upper cross-head 2 and table 3 joined by columns 4 and 5. Cradle 1 is mechanically connected to hydraulic piston 6 and is movable upwardly thereby. Cradle 7 is comprised of cross-head 8 and columns 9 and 10 having threaded portions 9a and 10a interconnected with mechanisms 11 and 12 which by actuation of crank 13 permits vertical adjustment of the cradle.

The construction of the loading unit permits application of loads to test specimens in either tension, compression, or in flexure. For example pipe 14 to be tested in compression is supported between crosshead 8 of fixed cradle 7 and table 3 of movable cradle 2. In this position an article may, depending upon the use of proper tools, be tested in either compression or flexure. Similarly, an article may be supported between cross-heads 2 and 8 for testing in tension.

Piston 6 is supported within hydraulic cylinder 15 which is adapted to receive fluid pressure from pressure control section C by way of connection 16 and to thereby upwardly move the piston. Shown in section C is an oil reservoir 17 connected to pump 18 which is driven by pump motor 19. The pump motor is turned on and off by push button switches 19a and 19b respectively. Fluid pressure developed by pump 18 is transmitted via connection 20 to control valve 21 which may be opened or closed by handle 22. Under operating conditions, i. e., when pressure is being applied to cylinder 15, pressure release valve 23 is closed. This valve is operated by handle 24. With valve 21 open and valve 23 closed, pressure is then transmitted through connections 25 and 16 to the cylinder.

The purpose of automatic valve 28 is to relieve the system by way of connection 29 when valve 21 is closed, which is the normal condition at the start of a test operation. When the valve 21 is opened fluid pressure transmitted to the valve 28 by connections 25 and 25a closes the valve and allows fluid pressure to be transmitted through connection 16. Valve 23, when opened by handle 24, is used to relieve the system by way of connection 24a. Normally this valve is opened at the end of a test operation.

The system incorporates certain safety features, for example, safety valve 26 will relieve the system via connection 27 if the working pressure becomes too high. In addition, if piston 6 is moved more than a predetermined amount, motor shut-off switch 30 is actuated by cam surface 31 to turn off pump motor 19.

The fluid pressure developed in cylinder 15 is transmitted by connection 32 to the control valve 33 of the pressure measuring and registering unit 34.

As mentioned heretofore, one important feature of the present invention is the adaptability of the system to measure and register a plurality of pressure ranges on a single load registering device. One form of load registering means is the dial face 35 with calibrated scales diagrammatically indicated in Figure 1 at 36 over which pointer 37 is adapted to be moved. Another form of load registering means is the stress-strain recorder 38 which is comprised essentially of a chart 39 secured to rotatable drum 40 over which pen 41 is adapted to be axially moved by rod 42. The invention contemplates a driving system common to both the mounting for shaft pointer 37 and for the rod 42 which moves the pen 41. Although both of these load registering devices are driven from a common source, the arrangement is such that either the pointer or the recorder may be the principal registering device.

Figure 8:
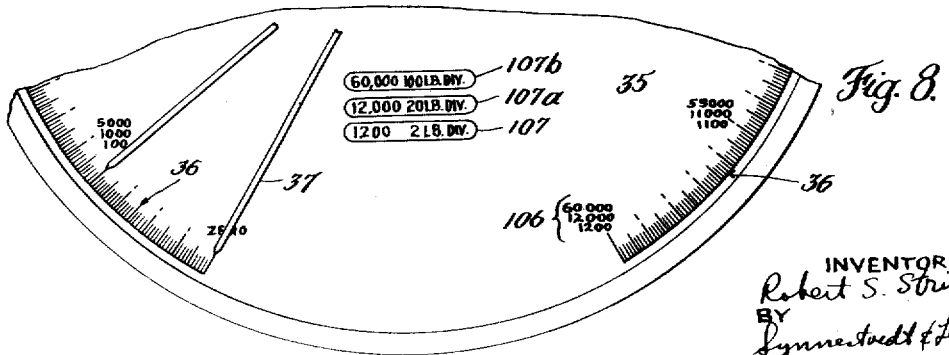
Figure 8 is a fragmentary and enlarged elevational view of the scale and pointer of the machine of Figure 1.

The drive system is made responsive to different pressure or load ranges, for example, in this instance the low range extends up to 1200 pounds, the medium range to 12,000 pounds, and the high range to 60,000 pounds. The ranges are shown marked on the scale 36 in Figure 8.

The operator may select the desired pressure range by means of knob 33a. For example, where the low range is selected and fluid pressure applied, the drive system will move the pointer or recorder and the full scale deflection will register 1200 pounds. Thus the amount of pressure or load being applied to the test specimen is directly indicated or recorded, or both.

The principle involved in the driving system is to generate a signal in accordance with the motion or displacement of a mechanism which is made responsive to changes in fluid pressure developed in cylinder 15 and to use this signal in a circuit adapted to actuate a motor which in turn drives both the pointer 37 and recorder pen 41.

The drive motor 44 (see Figures 2 and 3) is mechanically interconnected with both the pointer mounting shaft 43 and the recorder drive rod 42. To this end the motor shaft 44c has a pinion 44d secured thereto which meshes with gear 44e secured on the pointer shaft 43. The details and the particular features of the connections to the rod 42 will be described more fully hereinafter.

The circuit means for receiving the amove-mentioned signal and for actuating the drive motor may take a variety of forms. However, I have found that a servo system employing a null circuit is of special advantage because of the simplicity in arrangement of parts, ease of operation, and the high standard of accuracy. Before describing this circuit in detail, I wish to point out briefly the general principle of operation of the null circuit.

Essentially, the null circuit is comprised of a plurality of transducers or control elements, the output voltages of which are offset against one another to provide a null, i. e., a balanced voltage condition. Thus, a transducer is associated with a pressure responsive mechanism and its output voltage is proportional to the amount of displacement of the mechanism as dictated by the pressure developed in the cylinder. Another transducer is associated with the pointer drive shaft, its output voltage being proportional to the amount of angular rotation of the shaft and being out of phase with the first voltage. These two voltages are compared and any difference in magnitude is amplified and then used to actuate the drive motor 44, which rotates the pointer and displaces rod 42. The motor operates until the two voltages balance. A zeroing or balancing transducer is also associated with the null circuit; however, its operation does not affect the principles generally described above.

Thus the displacement of a pressure sensitive mechanism in accordance with the pressure developed in the cylinder produces a signal which by means of the above described system actuates the load registering devices directly indicating the amount of pressure or load being applied to a test specimen. Preferably the control elements herein are differential transformers of the usual construction, for example as shown in Patent 2,568,587. The transformers have the secondary windings arranged so that the output voltage is zero when the core is at the mid-point with the magnitude of the output voltage increasing as the core is moved off either side of the mid-point and there being a 180° phace shift of the output voltage as between positioning the core on either side of the mid-point.

Figure 2:
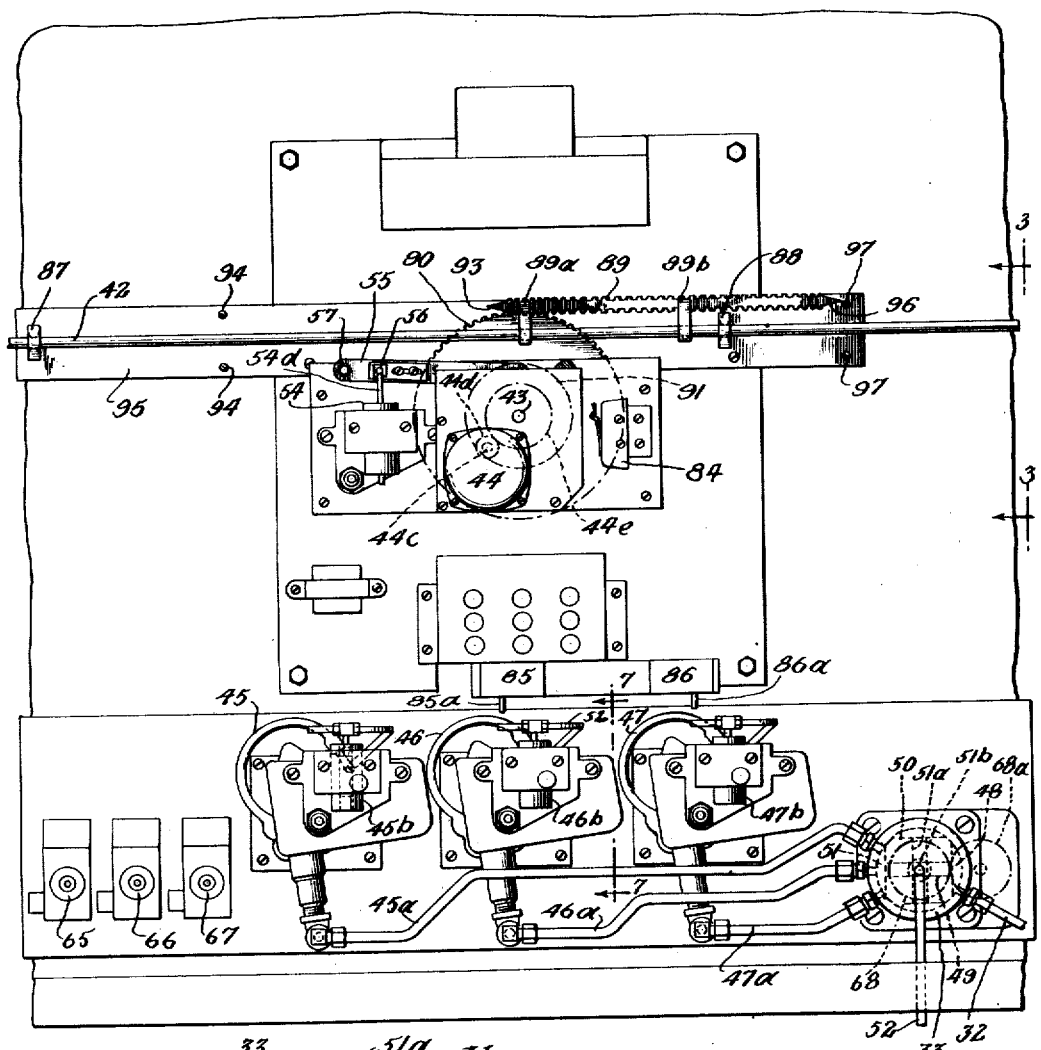
Figure 2 is a rear elevational view of certain parts of the operating mechanism of the machine of Figure 1, the showing of these parts of Figure 2 being on an enlarged scale.

According to the embodiment of the invention shown herein a plurality of pressure sensitive mechanisms or control devices 45, 46 and 47 are used as is shown in Figure 2. For this purpose U-shaped Bourdon tubes are used and these expand or open when the tube is subjected to fluid pressure. Each of the tubes is adapted to be selectively interconnected with cylinder 15 by means of valve 33; fluid connections 45a, 46a and 47a respectively connecting the tubes to the valve. Tube 45 is utilized for high pressure ranges and tubes 46 and 47 are used for medium and low pressure ranges respectively.

Tube 45 is designed to expand under the influence of increasing amounts of pressure up to a maximum of 60,000 pounds, while tube 47 is designed to expand under the influence of increasing amounts of pressure up to a maximum of 1200 pounds, and intermediate tube 46 being designed for 12,000 pounds' pressure.

The arrangement of the tubes provides a practical amount of expansion; that is to say, an expansion that is detectable without elaborate detecting devices for a given amount of fluid pressure. For example, 1200 pounds' pressure applied to high pressure tube 45 will produce an amount of expansion that is small in comparison to the amount produced by 1200 pounds' pressure applied to low pressure tube 47. Thus, by using a plurality of tubes which are sensitive to different ranges of pressure a high degree of accuracy may be obtained even where the working pressure applied to a test specimen is very low in value.

Figure 2A:
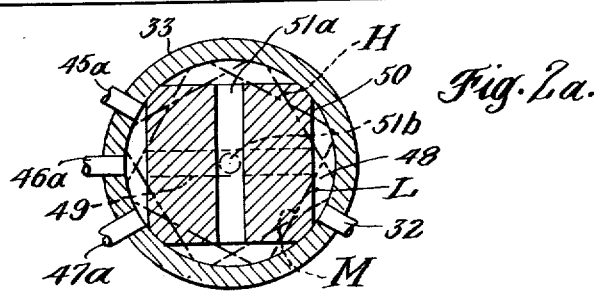
Figure 2a is an enlarged sectional view of the control valve of Figure 2.

Valve 33 is actuated by knob 33a by means of which the operator selects the desired pressure range. For the low range pressure the valve is in the position shown in Figure 2, this position also being shown in full lines in Figure 2a. In this position fluid pressure in connection 32 is communicated to chamber 48 and thence through passage 49 in valve body 50 to chamber 51, and thence to the low pressure tube 47 by way of connection 47a. If the valve is turned clockwise (when viewed as in Figures 2 and 2a) to the next position medium pressure tube 46 is connected by way of connection 46a through the same valve passage to the cylinder 15 and when the valve is turned still further clockwise to the high pressure position, high pressure tube 45, by way of connection 45a, is connected to the cylinder, again through the same valve passages.

It is to be noted that in the L or low pressure position (Figure 2a) not only is low pressure tube 47 connected with the fluid pressure source, but also medium and high pressure tubes 45 and 46 are connected thereto. However, the pressure communicated to tubes 45 and 46 is of no significance insofar as operation in the low pressure range is concerned, because of certain electrical connections which will be later described.

In the M or medium pressure position it is noted that high pressure tube 45 is connected, in addition to medium pressure tube 46. This is of no operating significance for reasons similar to those pointed out above. However, low pressure tube 47 is now disconnected from the pressure source, and this is desirable because the maximum amount of pressure which tube 47 is designed to withstand is much lower than the full scale medium range.

In the H or high pressure position only high pressure tube 45 is connected to the pressure source and tubes 46 and 47 are disconnected. This is desirable because neither of tubes 46 and 47 is designed to withstand the maximum pressure that may be applied to tube 45. When a tube is disconnected from the pressure source it is interconnected with the relief pipe 52, through chamber 51a in the valve body and the axially disposed port 51b which communicates with pipe 52. Relief pipe 52 is a return pipe extended to the oil reservoir.

Tubes 45, 46 and 47 are interconnected with transducers 45b, 46b, and 47b, which form elements of the null circuit briefly mentioned above.

Figure 7:
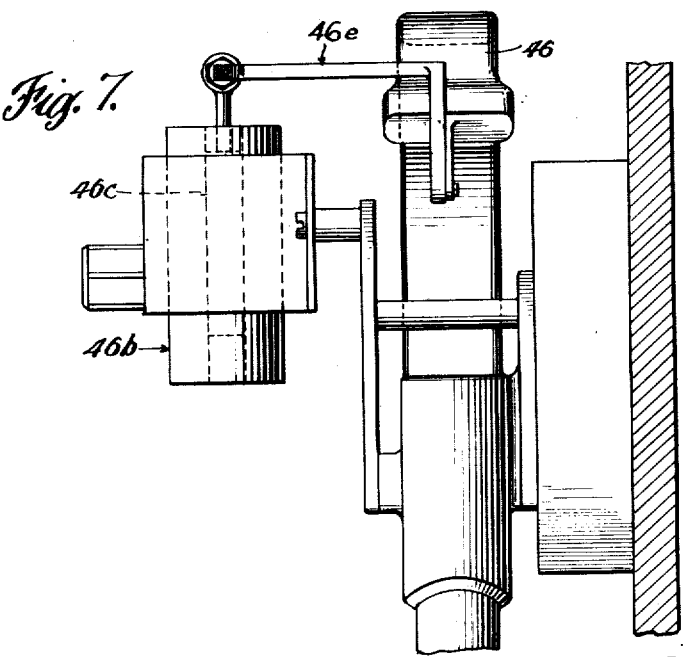
Figure 7 is an enlarged view taken as indicated by the line 7—7 applied to Figure 2.

An enlarged view of the connection between transducer 46b and tube 46 is shown in Figure 7. Since the arrangement of each tube and its associated transducer is identical only tube 46 and transducer 46b will be described. The transducer has a movable or displaceable core 46c which is connected with tube 46 by interconnecting linkage generally indicated by numeral 46e. When the tube 46 expands the core 46c is moved axially in the transducer. The transducer is essentially a differential transformer having primary and secondary windings. These windings are shown schematically in Figure 9 but are not illustrated in Figure 7, for the sake of simplicity. In Figure 9, $a$—$a1$ represent the primary windings while $b$—$b1$ represent the secondary windings of transducer 46b.

The transducers are adapted to be selectively connected with the null circuit and this is accomplished by switch means generally indicated by numeral 53 (see Figure 9), associated with valve 33 (see Figure 2). Thus the connection of a transducer to the null circuit is made concurrently with the selection of a particular pressure range. For example, if knob 33a is turned to connect high pressure tube 45 to cylinder 15, transducer 45b is connected to the null circuit while the other transducers remain disconnected. The details of the switching arrangement will be explained more fully hereinafter.

The primary windings are adapted to receive power from an independent source while the secondary windings are adapted to be connected in the null circuit. When the core 46c is moved relative to the windings a voltage will be produced in the secondary winding which is proportional to the amount of displacement. Since the displacement of the tube (and core) is proportional to the amount of fluid pressure in the tube the voltage produced in the secondary winding is proportional to the amount of pressure being applied to the test specimen.

Figure 6:
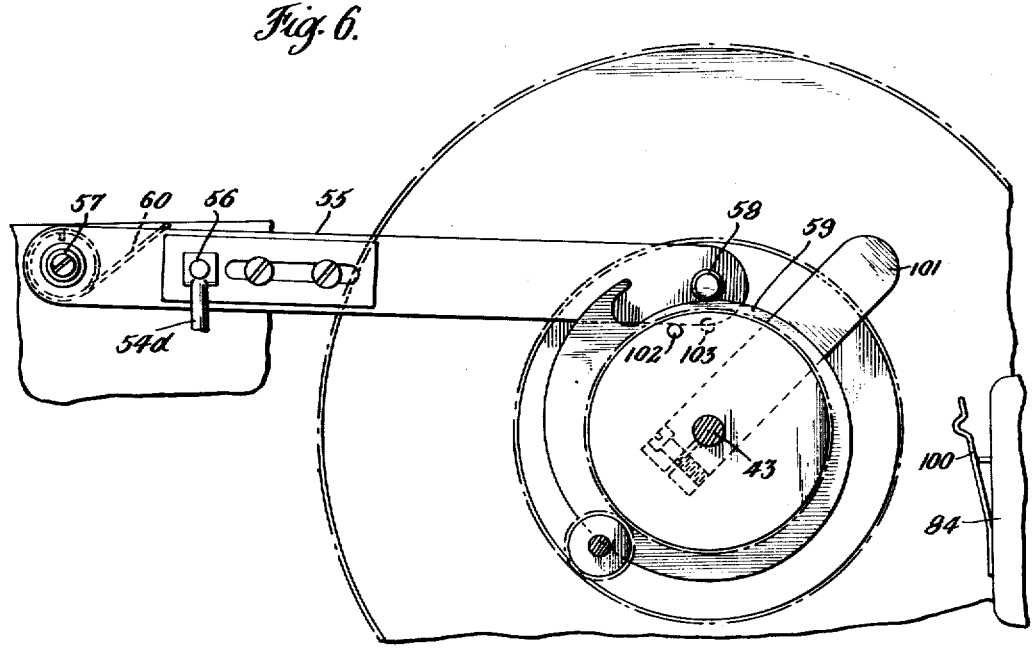
Figure 6 is a fragmentary view taken as indicated by the line 6—6 applied to Figure 3.

Another element of the null circuit is the transducer 54 which is associated with pointer drive shaft 43. Referring to Figures 2 and 6, the core of the transducer is attached to rod 54d which is pinned to link 55 at 56. One end of link 55 is pivoted at 57 and the other end carries roller 58 which rides on cam 59. Cam 59 is secured to pointer drive shaft 43 and is rotated as the shaft is driven by the motor. The roller 58 of link 55 is held firmly to cam 59 by the action of spring 60. Thus when the pointer drive shaft 43 is rotated the core operating rod 54d is moved up and down, displacing the core axially of the windings.

The construction of transducer 54 is identical to the transducers described above, its primary windings adapted to receive power from the same independent source and its secondary windings adapted to be connected in the null circuit. When the core of the transducer is moved relative to the windings a voltage will be produced on the secondary side, which is proportional to the angular rotation of shaft 43, this proportionality and voltage being accomplished by the mechanical linkage comprising cam 59 and link 55. Since the shaft 43 is coupled to the core in a known manner the voltage produced is then proportional to the position of pointer 37.

As mentioned heretofore, if knob 33a is turned to connect one of the pressure tubes for operation, switch 53 is also actuated. This is accomplished by means of gear 68 (Figure 2) which is secured to the shaft of control knob 33a, turning a gear (68a) which moves switch 53 and opens and closes the appropriate contacts. As seen in Figure 9, switch sections 53a—53b, 53c—53d, and 53e—53f are gang operated. If the medium pressure range is selected contacts 53c—53d are closed, while the other contacts remain open.

Certain other features of the operating and control circuit shown in Figure 9 should now be noted. Terminals 70—71 on amplifier 75 supply power to the primary winding of each of the transducers 45b, 46b and 47b, as well as to the primaries of certain other transducers to be described. Terminals 72—73 on the amplifier are for the purpose of receiving a signal from the secondary windings of the transducers. Thus where the medium pressure range is selected, tracing the circuit from terminal 70, it is seen power is supplied via conductor 70a to switch 53d and thence to windings $a4$—$a5$ of transducer 66. Windings $a4$ and $a5$ are connected in series with windings $a$—$a1$ of transducer 46b by conductor 70b and these latter windings are in turn series connected to windings *a*3—*a*2 of transducer 54 by conductor 70*c*. Conductor 71*a* then connects windings *a*2 to power supply terminal 71. The purpose of the zeroing transducers 65, 66 and 67, will be described later.

Thus the primary windings of the transducers are all connected in series and fed from a common source. If the high pressure tube 45 or low pressure tube 47 were selected for operation, the closing of switch section 53*a*—53*b* or 53*e*—53*f* would connect the primary windings of either transducer 65 or 67 in series with the primary windings of transducer 45*b* or 47*b* and the primary windings of transducer 54.

In a like manner the secondary windings of the transducers are adapted to be series connected. This circuit includes terminal 72, conductor 72*a* to switch 53*c* and secondary windings *b*4—*b*5 of transducer 66. Windings *b*4—*b*5 are connected in series with windings *b*—*b*1 of transducer 46*b* by conductor 72*b* and these latter windings are in turn series connected to windings *b*2—*b*3 of transducer 54 by conductor 72*c*. Conductor 73*a* then connects coil *b*3 to terminal 73 of amplifier 75. In a like manner if either the high pressure tube 45 or low pressure tube 47 were selected for operation the closing of switch section 53*a*—53*b* or 53*e*—53*f* would connect the secondary windings of either transducers 65 or 67 in series with the secondary windings of 45*b* or 47*b* and in series with the secondary windings of transducer 54.

The signal appearing at terminals 72—73 is amplified in the amplifier 75 by circuit means which need not be described. The amplifier signal is fed from output terminals 76—77 via conductors 76*a*—77*a* to coil 44*a*, which forms one phase of two phase drive motor 44. The other phase is supplied with power from source P via switch 78 and conductors 78*a* and 78*b*. When both coils 44*a* and 44*b* are energized the drive motor will rotate and drive the pointer shaft 43. Switch 78 is normally closed during operation of the equipment, so that current is normally supplied to winding 44*b* of motor 44. However, winding 44*a* only receives current at certain times in the operation of the equipment, as will further appear.

Pump motor 19 receives power from source P1 via switch 79 as follows: When push button switch 19*a* (see Figures 1 and 9) is closed solenoid 82 is energized operating its movable core (not shown) to close switches 83 and 79, the core being mechanically linked with these switches. Limit switch 30 (see Figures 1 and 9), and also switches 84, 85 and 86 being normally closed, the solenoid 82 will continue to receive power even after switch 19*a* springs to its normally open position. When it is desired to shut off the pump the circuit may be temporarily broken by operation of the stop switch 19*b* which is normally biased to close position.

Having generally described the construction and operation of transducers associated with the Bourdon tubes, namely, transducers 45*b*, 46*b*, and 47*b*, together with transducer 54 associated with the pointer drive shaft, and the purpose of these transducers in the null circuit, the purpose and operation of transducers 65, 66 and 67 should now be noted.

The purpose of these transducers in the null circuit is to provide for a datum of zero point for each pressure range. Transducer 65 is for high range; transducer 66 for medium range; and transducer 67 for low range. The transducers are identical in construction as those described above. For example, transducer 66 (Figure 9) has primary windings *a*4 and *a*5, and secondary windings *b*4, *b*5 and movable core 66*c*, which is actuated by knob 66*d* (Figure 1). Knobs 65*d* and 67*d* (Figure 1) actuate the cores of their respective transducers. The primary windings on each of these transducers is fed from the same power source as the primary windings of the transducers mentioned heretofore, while the secondary windings are adapted to be selectively connected in series with the secondaries of either transducer 45*b*, 46*b* or 47*b* and transducer 54. The details of the switching arrangement accomplishing these connections have been described above.

Having in mind the above description of the elements comprising the hydraulic system and the drive system for the load registering devices, the interrelation between the various elements will be further clarified from a description of the operation of the system as a whole.

The operator turns on pump motor 19 by means of switch 19*a* and then by moving knob 33*a* selects the desired test pressure range, for example, the medium pressure range. At this point, i. e., no load condition, it may be necessary to balance the system, that is to say, to bring pointer 37 to the zero calibration. This is accomplished by actuating the proper zeroing transducer, which, in this case, would be 66, by moving knob 66*d*.

Turning the knob 66*d* moves core 66*c* to develop a voltage across secondary windings *b*4 and *b*5 (Figure 9). This voltage is then transferred to amplifier 75 by the circuit means described above, and is utilized to drive motor 44, which, by turning shaft 43, actuates the core 54*d* of transducer 54 to develop a voltage across secondary winding *b*2 to *b*3. When these two voltages are equal, the motor stops turning, as, under this condition no signal is fed to the amplifier. The operation of the system is completely automatic and it is only necessary for the operator to adjust the knob until the pointer reads zero.

The core of the zeroing transformer 66 can be moved to either side of the zero voltage output of the transformer and, therefore, the phase of its voltage can be changed or shifted with respect to the phase of the voltage of the particular control transducer selected (45*b*, 46*b*, or 47*b*, which in this case would be 46*b*). Zero adjust is desired because the Bordon tubes may not always (under no load conditions) contract so that the core of the connected transducer is at the zero or midpoint, hence with an error signal the pointer can be driven slightly off the zero position. In the usual case the operation of the zero adjust transducer produces a voltage in opposition to the Bourdon tube transducer such that the pointer will be driven to the zero position.

Valve 23 (Figure 1) being closed, handle 22 is actuated to open valve 21 and apply pressure to the article to be tested. This pressure is then communicated to Bourdon tube 46, which expands under the influence of fluid pressure and moves core 46*c* to develop a voltage across secondary windings *b*—*b*1. This voltage is then fed to amplifier 75 which drives motor 44 until a corresponding voltage is developed across windings *b*2—*b*3 of transducer 54. The motor moves until these two voltages are balanced. The motor also moves pointer 37, which, of course, registers the amount of load being applied to the test specimen.

Although the operation of the system was described in terms of the medium pressure, the same procedure is followed when the low or high pressure ranges are used.

Thus it is seen that by the use of a plurality of pressure-sensitive devices in conjunction with the drive system as describe above, a highly effective arrangement for measuring and indicating a wide range of test pressures has been developed.

I have found that the use of a plurality of such devices or mechanisms, each of which may be selectively interconnected with the driving system and the hydraulic cylinder, and each being peculiarly sensitive to certain amounts or ranges of fluid pressure, results in distinct advantages and is conducive to new and unexpected results.

For example, such an arrangement is very versatile and flexible, lending itself for adaptation in a wide variety of pressure ranges without, however, requiring the operator to observe more than a single load registering scale, which is a decided advantage in test work of the kind in question. Further, the arrangement of the present invention is especially useful because of the high degree of accuracy which may be attained even in the low pressure ranges.

There are certain safety features associated with the measuring system. As seen in Figure 2, switches 85 and 86 (heretofore mentioned in connection with Figure 9) are mounted directly above medium pressure tube 46 and low pressure tube 47. The purpose of the switch is to cut off operation of the pump motor 19 under certain conditions. For example, when the high pressure range is being used tubes 46 and 47 are ordinarily disconnected from the pressure cylinder 15. However, if for any reason valve 33 fails to operate to disconnect these tubes, either or both might be subjected to high pressure with consequent damage to the tube. Therefore, if either tube 46 or 47 expands beyond a predetermined amount, plunger 85a or 86a would be contacted to operate switch 85 or 86 and turn off the motor 19. How the cut-off is accomplished will be readily understood from an inspection of Figure 9 and the description heretofore given. If either switch 85 or 86 is opened, relay 82 is deenergized and operates to open switch 79 to cut off power to the motor 19.

Of particular significance and importance in the present invention is the drive system comprising the mechanical interconnections between the drive motor 44 and the recorder unit 38. Certain features and advantages of the mechanical interconnection will be readily apparent from the following description.

As shown on Figure 1, the recorder pen 41 is secured to rod 42 by means of adapter 40a. The connection between the rod 42 and the adapter 40a is a frictional connection of the type providing for movement of the adapter lengthwise with the rod and for disengagement of the pen from the drum by manually rotating the adapter relative to the rod. As is best seen in Figure 2, the rod 42 is slidably mounted in bearings 87 and 88. A rack or drive means 89 is secured to the rod 42 by members 89a and 89b. This rack, as shown in Figures 2 and 3, is illustrated in its position of engagement with a gear 90 secured to and driven by the pointer shaft 43. In Figure 2 these parts are in the zero position of the pointer and when the pointer is rotated by the motor 44 in a counterclockwise direction (when viewed as in Figure 2) the rack moves to the left.

Secured to and driven by the shaft 43 is a second gear 91 of smaller diameter than the gear 90 with which the rack 89 is also adapted to engage. This is accomplished by rotating the rod 42 by means of knob 92 (see Figure 1) to swing the rack from the position of Figure 3 to that shown in Figure 5.

The purpose of employing the arrangement for selective engagement of the rack with gears of different diameters is to change the ratio of movement of the pen with respect to the movement of the pointer, it being observed that when the rack is in engagement with the larger gear 90, the axial movement of the rod 42 and its pen 41 is substantially greater than that obtained when the rack is in engagement with the smaller gear 91 for a given amount of rotation of shaft 43.

Thus, the provision of the large gear 90, providing for magnification of the recording, i. e., the magnification of the stress-strain diagram, is an important part of the present invention, as it enables highly detailed study of specimen behavior in any portion of the load range. For example, it is often desirable in test work of the kind in question to observe in minute detail the action of the test specimen in the early plastic stages. Thus, a test specimen may be loaded, for example, up to or near the elastic limit, with the rack engaged with gear 91, then the knob 92 may be turned to engage the rack with gear 90. Upon further application of test pressure, the recording will, as described above, be magnified, thus providing means for accurate study of specimen strain in the plastic stage.

The invention contemplates certain safety features which prevent overtravel of the recorder pen 41. This is accomplished by cam surfaces associated with the rack 89. With reference to Figure 2, it is observed that when the rack 89 approaches the limit of travel toward the left, the cam surface 93 thereof engages one of the pins 94 carried by the fixed mounting bar 95, the upper pin 94 being engaged when the rack is in engagement with the larger gear 90 and the lower pin 94 being engaged when the rack is in engagement with the smaller gear 91. Continued movement of the rack to the left beyond the desired limit will cause the cam surface 93 to ride on the pin 94, with the result that the rack is rocked out of engagement with its gear to the position shown in Figure 4 and no further movement will be imparted to the rack and the pen 41.

Rack 89 is also adapted to be disengaged from either of the gears 90 or 91 when it approaches the end of its stroke to the right as viewed in Figure 2, i. e., toward the zero position of the pointer. This is of advantage since the rack 89 is engageable with either of the gears 90 and 91 in any relative position, including positions which would tend to drive the rack beyond its normally zero position at the end of a test run. In this event, the cam surface 96 of the rack engages either of the pins 97 carried by the fixed mounting bar 95 and lifts the rack out of engagement.

It is also pointed out that the recording device may be rendered inactive by axially moving the rod 42 into a position in which either of the cam surfaces thereof engages the pins 94 or 97 to hold the rack out of engagement with the gears.

Certain other safety features are provided for the pointer mechanism. Referring particularly to Figures 2, 3 and 6, I have provided the switch device 84 comprising a switch actuating member 100 adapted to be engaged by an arm 101 secured to the pointer shaft 43. In Figure 6 the arm 101 is illustrated in the position it assumes when the pointer is in zero position. When load is applied to move the pointer toward the maximum end of the scale, the arm 101 rotates (counterclockwise as viewed in Figure 2) therewith, and in the event that the pointer passes this maximum point, the arm 101 engages the member 100 to open the switch 84, thus causing the motor 19 to be stopped. As hereinabove pointed out in the description of Figure 9, switch 84 is normally closed, and the opening of the switch by the arm 101 deenergizes relay 82, thereby opening switch 79 to stop pump motor 19.

In the event of still further overtravel, for example, should the switch 84 fail to stop the motor 19, a pin 102 (see Figures 3 and 6) carried by the gear 44e of the pointer shaft 43 engages pin 103 carried by the fixed support 104, stalling the motor and thus preventing further movement of the pointer.

The registering system comprising the movable pointer and associated calibrated scales together with certain signal devices provided therewith form an important part of the present invention. These elements will now be described in detail.

A plurality of calibrated scales are provided on the dial face 35, there being one scale for each pressure range. A single set of calibrations serves for all of the scales. The scales comprise calibrations 36, some of which 36a are made to form successively arranged indicia representing different load values. Also there are a plurality of sets of numbers 106, which are commonly arranged and aligned respectively with each indicia in the manner shown in Figure 8. The zero and maximum indicia and numbers of each scale are coincident, and the indicia and numbers are applied at regular intervals throughout the scale. This is particularly advantageous because the pointer then travels the same distance over the full range of each scale resulting in simplification of the pointer driving mechanism as compared with arrangements requiring the use of independent pointers and scales.

As an aid to the operator in reading these scales, the numbers for each scale are applied in different colors. For example, the numbers for the low pressure range are in red, while those for the medium range are in green, and the high pressure range in blue.

Another important feature of the present invention is the provision of signal devices 107, 107a, and 107b which are adapted to be selectively illuminated upon the selection of a test pressure range by the operator. The purpose of these devices is to visually indicate to the operator the particular range scale to be read, providing against inadvertent reading of an incorrect scale. The illumination of these signal devices is in color corresponding to the colors of the numbers mentioned above. Thus, where the low pressure range is selected, signal device 107 is illuminated in red.

The illumination of these devices is accomplished by the opening and closing of certain contacts associated with switch 53 which is actuated as described heretofore when the operator turns knob 33a to select a pressure range. The circuit means for the signal devices is shown in Figure 9. It will be observed that either light 109 for signal device 107 or light 110 for signal device 107a or light 111 for signal device 107b may be independently interconnected with secondary winding of transformer 108 by the closing of either contact 53g, 53h, or 53i of switch 53. The primary winding is supplied with power from source P by way of switch 78.

Pointer 112 is rotatably mounted on dial face 35 and may be moved over the scales by means of knob 113. The pointer is used as an aid to the operator in situations, for example, where a large number of specimens are to be tested at a fixed pressure. The pointer may be rotated to a predetermined position on the dial face and then load applied to the test specimen until pointer 37 is in the same relative position as pointer 112.

I claim:

1. For a testing machine a stress registering system comprising: a dial face; a single set of calibrations on said dial face some of which are made to form successively arranged indicia representing different stress values; a plurality of sets of stress-value members on said dial face commonly arranged and aligned respectively with each indicia, the numbers and the calibrations forming a plurality of scales for different ranges of stress and the numbers of a scale being the same color but different from the colors of the numbers of the other scales; a pointer mounted for movement over said scales; a drive system for said pointer alternatively responsive to different ranges of stress; control mechanism for selectively activating said drive system to respond to different ranges of stress; a plurality of visual signal devices adapted to indicate to the operator which scale is to be read, each signal device being of a different color corresponding to the colors of said numbers indicia; and mechanism associated with said control mechanism providing for selective actuation of said signal devices concurrently with the activating of said drive system.

2. For a testing machine, a stress registering system comprising: a plurality of devices adapted to be connected with a source of fluid pressure used in stressing an article, each being expansible under the influence of fluid pressure and responsive to a different range of fluid pressure; registering mechanism to denote stress applied to an article; drive mechanism for said registering mechanism including a motor and a system for operating the motor comprising a balancing transducer having an operating portion connected and movable with said registering mechanism, a plurality of control transducers each connected in series with the balancing transducer and each having an operating portion connected with and movable by an expansible device and a plurality of zeroing transducers respectively connected in series with said control transducers, each having a manually movable operating portion; and mechanism for selecting one of said control transducers, one of said zeroing transducers and a pressure expansible device for operation in accordance with the desired range of fluid pressure.

3. For a testing machine, a stress registering system comprising: registering mechanism to denote stress applied to an article; drive mechanism for said registering mechanism including a motor and a system for controlling the operation of the motor comprising a first control element having an operating portion connected and movable with said registering mechanism a plurality of control elements each having an operating portion responsive to stress applied to the article and a plurality of zeroing control elements each having a manually adjustable operating portion; means to activate said plurality of control elements including a plurality of control devices operable in accordance with the amount of stress being applied, each device being responsive to a different range of stress; and mechanism for selecting respectively one of said zeroing control elements and one of said plurality of control elements and a control device for operation in accordance with the desired range of stress.

4. For a testing machine, a stress registering system comprising: registering mechanism to denote stress applied to an article; drive mechanism for said registering mechanism including an electric motor and a null circuit for controlling the operation of the motor comprising a balancing transducer having an operating portion connected and movable with said registering mechanism a plurality of control transducers, each having an operating portion responsive to stress applied to an article and a plurality of zeroing transducers each having a manually adjustable operating portion; means to activate the operating portions of said plurality of control transducers operable in accordance with the amount of stress applied; and switch mechanism for selecting respectively one of said zeroing transducers and one of said plurality of control transducers for operation in accordance with the desired range of stress.

5. For a testing machine, stress registering apparatus comprising: movable mechanism to denote stress applied to an article; a motor including a drive shaft for positioning said movable mechanism; a system for controlling the operation of the motor comprising a first control element for developing a first signal for driving the motor and having an actuating portion regulating said signal and connected with the motor shaft whereby the developed signal differs when the shaft rotates to position said movable mechanism, a plurality of control elements selectively connectible in the system for respectively developing signals for driving the motor, each having an operating portion regulating the signal developed by the control element, a plurality of zeroing control elements selectively connectible in a system for respectively developing signals for use in driving the motor for the zeroing of the system and each having a manually adjustable operating portion for regulating the signal developed; means to activate said plurality of control elements including a plurality of control devices each being respectively connected to an operating portion of one of said plurality of control elements and each operable in accordance with the amount of stress being applied, each device being responsive to a different range of stress; and mechanism for selectively operatively series connecting said first control element, one of said plurality of control elements and one of said plurality of zeroing control elements and effecting operation of one of said control devices.

6. For a testing machine, stress registering apparatus comprising: registering mechanism to denote stress applied to an article including a pointer; an electric motor including a drive shaft for positioning said pointer; a system for controlling the operation of the motor comprising a first transducer developing a voltage having a displaceable element connected with the motor shaft whereby the element is variably displaced when the shaft rotates to position said pointer, a plurality of transducers selectively connectible in the system for respectively developing voltages out of phase with said first voltage, each having a displaceable element for regulating the voltage thereof and a plurality of zeroing transducers selectively connectible in the system and each having a manually displaceable element for developing a voltage whose phase is shiftable with respect to the phase of the voltage of said first transducer, each of said zeroing transducers being usable in the zeroing of the system; control means for said plurality of transducers being connected to the displaceable elements thereof, and operable in accordance with the amount of stress being applied; and mechanism for selecting one of said plurality of transducers and one of said plurality of zeroing transducers for operation.

7. For a testing machine: a movable pointer adapted to indicate a plurality of test ranges of stress applied to an article under test; a driving system for said pointer including a drive motor having a rotatable drive shaft and at least one field coil adapted to receive an actuating voltage, mechanical linkage between the motor shaft and said pointer, a transducer having a movable element adapted to be displaced in accordance with the rotation of said motor shaft whereby to deliver a first voltage; a plurality of transducers each having a movable element adapted to be displaced in accordance with the stress being applied to an article under test whereby to deliver a second voltage out of phase with the first voltage; a plurality of zeroing transducers each having a movable element adapted to be manually displaced whereby to deliver a voltage whose phase is shiftable with respect to the phase of said first voltage and circuit means including a selector switch for selectively operatively connecting first said transducer, one of said plurality of transducers and one of said zeroing transducers in series with the motor field coil.

8. A system for registering change in a condition comprising: registering mechanism to denote said change in condition; drive mechanism for said registering mechanism including a motor and a circuit for controlling the operation of the motor comprising a plurality of control elements selectively connectible in the circuit, each developing signals for driving the motor and each having an operating portion responsive to said change in condition for regulating the signals thereof, another control element for developing a signal out of phase with any of the first-mentioned signals whereby to stop operation of the motor and having an operating portion for regulating the signal connected with and movable by said motor and a plurality of zeroing control elements each selectively connectible in the circuit and each having a manually adjustable operating portion for developing a signal whose phase is shiftable with respect to the phase of last said control element; and mechanism for selecting one of said plurality of control elements and one of said plurality of zeroing control elements for operation in the circuit.

References Cited in the file of this patent

UNITED STATES PATENTS

| | | |
|---|---|---|
| 291,769 | Portillo | Jan. 8, 1884 |
| 1,038,380 | Johanson | Sept. 10, 1912 |
| 1,276,279 | Smith | Aug. 20, 1918 |
| 2,014,357 | Klemperer | Sept. 10, 1935 |
| 2,033,623 | Freeland | Mar. 10, 1936 |
| 2,124,684 | Behr et al. | July 26, 1938 |
| 2,212,085 | Tate | Aug. 20, 1940 |
| 2,289,379 | Neill | July 14, 1942 |
| 2,306,917 | Tate | Dec. 29, 1942 |
| 2,404,868 | Sivertsen | July 30, 1947 |
| 2,425,941 | Kahn | Aug. 19, 1947 |
| 2,445,200 | Wolfe | July 13, 1948 |
| 2,486,357 | Gilbert | Oct. 25, 1949 |
| 2,555,633 | Comins | June 5, 1951 |
| 2,597,188 | Rozett | May 20, 1952 |
| 2,611,812 | Hornfeck | Sept. 23, 1952 |
| 2,615,936 | Glass | Aug. 17, 1954 |
| 2,686,893 | Markson | Aug. 17, 1954 |

FOREIGN PATENTS

| | | |
|---|---|---|
| 216,713 | Switzerland | Dec. 16, 1941 |

UNITED STATES PATENT OFFICE
CERTIFICATE OF CORRECTION

Patent No. 2,808,721                                                      October 8, 1957

Robert S. Strimel

It is hereby certified that error appears in the above numbered patent requiring correction and that the said Letters Patent should read as corrected below.

In the grant, lines 2 and 12, name of assignee, for "Tenius Olsen Testing Machine Company," read -- Tinius Olsen Testing Machine Company, --; in the heading to the printed specification, lines 4 and 5, for "Tenius Olsen Testing Machine Company," read -- Tinius Olsen Testing Machine Company, -- ; in the printed specification, column 3, line 10, for "Cradlle" read -- Cradle --; column 4, line 65, for "phace" read -- phase --; column 7, line 2, for "windings" read -- winding --; line 62, for "of zero" read -- or zero --; column 8, line 35, for "Bordon" read -- Bourdon --; line 60, for "describe" read -- described --; column 11, line 54, claim 1, strike out "indicia".

Signed and sealed this 3rd day of December 1957.

(SEAL)
Attest:
KARL H. AXLINE

Attesting Officer                                                     ROBERT C. WATSON
                                                                                      Commissioner of Patents